United States Patent
Schmittenberg et al.

(10) Patent No.: US 9,500,129 B2
(45) Date of Patent: Nov. 22, 2016

(54) TURBOSHAFT ENGINES HAVING IMPROVED INLET PARTICLE SCAVENGE SYSTEMS AND METHODS FOR THE MANUFACTURE THEREOF

(71) Applicant: HONEYWELL INTERNATIONAL INC., Morristown, NJ (US)

(72) Inventors: Marc Schmittenberg, Phoenix, AZ (US); Brian Hesano, Scottsdale, AZ (US); Lee Glascoe, Chandler, AZ (US); Yogendra Yogi Sheoran, Scottsdale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1028 days.

(21) Appl. No.: 13/663,281

(22) Filed: Oct. 29, 2012

(65) Prior Publication Data

US 2014/0119891 A1  May 1, 2014

(51) Int. Cl.
*F02C 7/05* (2006.01)
*B64D 33/02* (2006.01)

(52) U.S. Cl.
CPC .............. *F02C 7/05* (2013.01); *B64D 33/02* (2013.01); *B64D 2033/0246* (2013.01); *Y10T 29/4932* (2015.01)

(58) Field of Classification Search
CPC ............. F01D 25/002; F01D 25/32; F05D 2260/607; F05D 2260/213; F02C 7/05; F02C 7/052; B64D 33/02; B64D 2033/0246; Y10T 29/4932
USPC ................................... 415/121.2
See application file for complete search history.

(56) References Cited

U.S. PATENT DOCUMENTS

| | | | |
|---|---|---|---|
| 2,752,111 A | 6/1956 | Schairer | |
| 2,944,731 A | 7/1960 | Kastan | |
| 3,329,377 A | 7/1967 | Peterson et al. | |
| 3,449,891 A * | 6/1969 | Amelio | B64D 33/02 244/53 B |
| 3,630,003 A | 12/1971 | Ashton et al. | |
| 3,979,903 A | 9/1976 | Hull, Jr. et al. | |

(Continued)

FOREIGN PATENT DOCUMENTS

| | | |
|---|---|---|
| EP | 0103384 B1 | 9/1988 |
| GB | 570424 A | 7/1945 |
| JP | 4297397 A | 10/1992 |

*Primary Examiner* — Craig Kim
*Assistant Examiner* — Alexander White
(74) *Attorney, Agent, or Firm* — Lorenz & Kopf, LLP

(57) ABSTRACT

Embodiments of a turboshaft engine are provided, as are embodiments of a method for manufacturing a turboshaft engine. In one embodiment, the turboshaft engine includes an Inlet Particle Separator (IPS) system having an IPS scavenge flow circuit fluidly coupled to the engine's inlet section. A heat exchanger and a heat exchanger bypass duct are fluidly coupled to the IPS scavenge flow circuit. The heat exchanger bypass duct is configured to direct airflow around the heat exchanger. A particle separation device, such as an IPS blower, is fluidly coupled in series with the heat exchanger in the IPS scavenge flow circuit. The particle separation device is positioned to direct particulate matter entrained within the airflow through the IPS scavenge flow circuit into an inlet of the heat exchanger bypass duct and thereby reduce the amount of particulate matter ingested by the heat exchanger during operation of the turboshaft engine.

20 Claims, 5 Drawing Sheets

(56) References Cited

U.S. PATENT DOCUMENTS

| | | | |
|---|---|---|---|
| 3,993,463 A * | 11/1976 | Barr | B01D 45/16 |
| | | | 244/53 B |
| 4,456,458 A * | 6/1984 | Gilbertson | B01D 45/04 |
| | | | 244/53 B |
| 4,756,664 A | 7/1988 | Cohen et al. | |
| 4,798,047 A | 1/1989 | Geary | |
| 4,971,518 A | 11/1990 | Florin | |
| 6,817,572 B2 | 11/2004 | Negulescu et al. | |
| 6,986,256 B2 | 1/2006 | Yamanaka et al. | |
| 7,836,701 B2 | 11/2010 | Zack et al. | |
| 2009/0025362 A1 | 1/2009 | Chapkovich et al. | |
| 2016/0045923 A1 * | 2/2016 | Correia | F01D 5/081 |
| | | | 55/392 |

\* cited by examiner

TURBOSHAFT ENGINES HAVING IMPROVED INLET PARTICLE SCAVENGE SYSTEMS AND METHODS FOR THE MANUFACTURE THEREOF

TECHNICAL FIELD

The present invention relates generally to gas turbine engines and, more particularly, to turboshaft engines having improved inlet particle scavenge systems well-suited for usage within ambient environments contaminated by sand and other airborne debris.

BACKGROUND

Turboshaft engines are a type of gas turbine engine optimized for the production of shaft power rather than propulsive thrust. Turboshaft engines are often employed onboard watercraft, helicopters, and tanks, as well as utilized within auxiliary power units and industrial power generators. A turboshaft engine commonly includes an intake section, a compressor section, a combustion section, a gas turbine section, a power turbine section, and an exhaust section arranged in flow series. During operation, the intake section draws ambient airflow into the engine. The airflow is compressed within the compressor section and supplied to the combustion section wherein the airflow is mixed with fuel. The resulting fuel/air mixture is then ignited to produce combustive gases, which expand rapidly through the gas and power turbine sections to drive the rotation of the turbines contained therein. Rotation of the gas turbine or turbines drives further rotation of the compressor disk or disks, which are joined to the gas turbine by way of one or more shafts. Rotation of the power turbine (also referred to as the "free turbine" in platforms wherein the power turbine rotates independently of the gas turbine or turbines) drives the rotation of an output shaft, which serves as the rotary output of the turboshaft engine. Depending upon the particular platform in which the turboshaft engine is utilized, the output shaft may be coupled to a power generator and/or a propulsive element, such as the main rotor of a helicopter. After flowing through the power turbine section, the combustive gas flow is expelled from the engine through the exhaust section.

Ingestion of large quantities of sand, dust, ice, and other particulate matter into a gas turbine engine can cause various problems, such as accelerated compressor erosion, turbine blade glazing, bearing contamination, and cooling flow passage blockage, to list but a few examples. Turboshaft engines are especially prone to ingestion of sand and dust when utilized within contaminated environments and operated in close proximity to the ground, such as when deployed onboard a helicopter or tank operated in desert environment. For this reason, turboshaft engines are commonly equipped with Inlet Particle Separator (IPS) systems, which remove a large portion of the particulate matter entrained in the intake airflow prior to delivery into the engine's compressor section. An IPS system may remove particulate matter from the intake airflow by guiding the airflow along a flow path having a bowed or arced cross-sectional geometry such that particulate debris entrained in the airflow is directed radially outward from the engine centerline and into a particulate trap or chamber (e.g., a scroll) feeding into a dedicated IPS scavenge flow passage. The airflow through the IPS scavenge flow passage may thus contain a high concentration of particulate matter when the turboshaft engine is operated in a desert environment or other environment containing large amounts of airborne particulate debris. The IPS scavenge flow passage directs the debris-laden airflow around the other sections of the turboshaft engine before discharging the airflow overboard. A fan commonly referred to as "IPS blower" is typically positioned in the IPS scavenge flow passage to help urge the debris-laden airflow through the scavenge flow passage. An efficient IPS system may be capable of removing upwards of 95% of sand and other particulate matter from the intake air stream to provide the compressor section with a relatively clean source of air during engine operation. Nonetheless, further improvements in IPS-equipped turboshaft engines are still desired and are provided herein.

BRIEF SUMMARY

Embodiments of a turboshaft engine are provided. In one embodiment, the turboshaft engine includes an inlet section and an Inlet Particle Separator (IPS) system. The IPS system includes, in turn, an IPS scavenge flow circuit fluidly coupled to the inlet section, a heat exchanger fluidly coupled to the IPS scavenge flow circuit and configured to receive airflow therefrom, and a heat exchanger bypass duct fluidly coupled to the IPS scavenge flow circuit and having an inlet upstream of the heat exchanger. The heat exchanger bypass duct directs airflow received at the inlet around the heat exchanger. A particle separation device, such as a strategically-positioned IPS blower, is disposed in the IPS scavenge flow circuit and fluidly coupled in series with the heat exchanger. The particle separation device is positioned so as to direct particulate matter entrained within the airflow through the IPS scavenge flow circuit into the inlet of the heat exchanger bypass duct to reduce the amount of particulate matter ingested by the heat exchanger during operation of the turboshaft engine.

Further provided are embodiments of a method for the manufacture of an IPS system utilized in conjunction with a gas turbine engine, such as a turboshaft engine, having an intake section. In one embodiment, the method includes the step of fluidly coupling an IPS scavenge flow circuit to the intake section of the gas turbine engine. An IPS blower and a heat exchanger are placed in flow series within the IPS scavenge flow circuit. The IPS blower is positioned upstream of the heat exchanger and is configured to generate centrifugal forces during operation urging particulate matter entrained in the airflow through the IPS scavenge flow circuit around the heat exchanger to reduce the amount of particulate matter ingested by the heat exchanger.

BRIEF DESCRIPTION OF THE DRAWINGS

At least one example of the present invention will hereinafter be described in conjunction with the following figures, wherein like numerals denote like elements, and.

Figure 1:
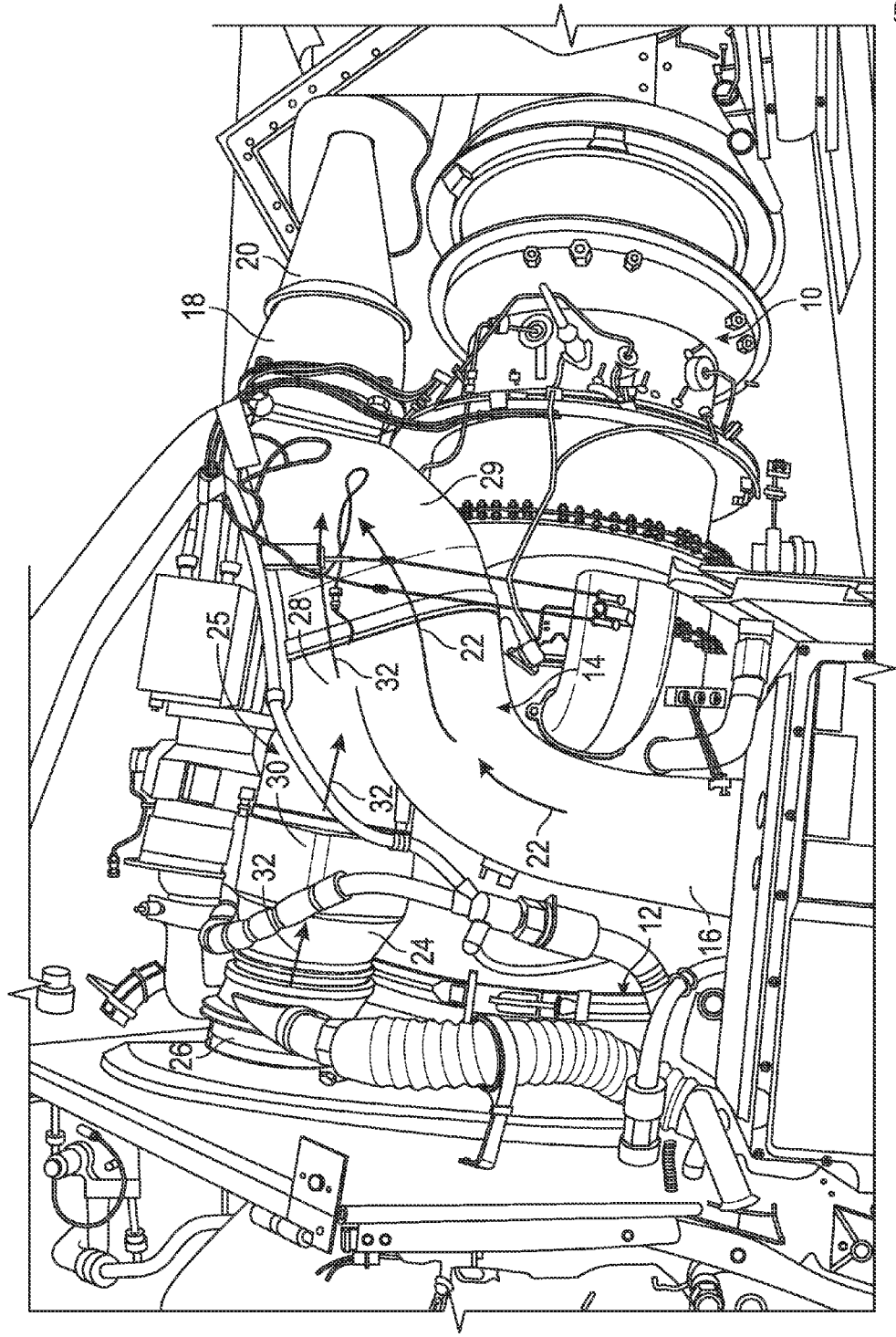
FIG. 1 is an isometric view of a turboshaft engine including heat exchanger system fluidly coupled in parallel with an inlet particle separator system (IPS), as illustrated in accordance with the teachings of prior art.

For simplicity and clarity of illustration, the drawing figures illustrate the general manner of construction and may omit depiction, descriptions, and details of well-known features and techniques to avoid unnecessarily obscuring the exemplary and non-limiting embodiments of the invention described in the subsequent Detailed Description. It should further be understood that features or elements appearing in the accompanying figures are not necessarily drawn to scale unless otherwise stated. For example, the dimensions of certain elements or regions in the figures may be exaggerated relative to other elements or regions to improve understanding of embodiments of the invention.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

FIG. 1 is an isometric view of a turboshaft engine 10 including an intake section 12 and an Inlet Particle Separator (IPS) system 14, as illustrated in accordance with the teachings of prior art. IPS system 14 includes ducting 16, which defines or encloses a main flow path of IPS system 14 referred to herein as "IPS scavenge flow circuit 16." Although hidden from view in FIG. 1, the inlet of IPS scavenge flow circuit 16 receives airflow from the main engine inlet of intake section 12. When turboshaft engine 10 is operated in an environment, such as a desert environment, containing large amounts of sand and other airborne particulate matter, the airflow drawn into intake section 12 may likewise contain large amounts of particulate matter. IPS system 14 includes a debris trap or chamber (not shown) that receives much of this particulate matter and directs it, along with a portion of the airflow diverted from the main inlet, along IPS scavenge flow circuit 16. The airflow conducted by IPS scavenge flow circuit 16 may thus contain high concentrations of sand, dust, or other particulate matter, depending upon the level of airborne contamination in environment in which turboshaft engine 10 operates. An IPS blower is located in section 18 of IPS scavenge flow circuit 16; and, when energized, draws the debris-rich airflow through IPS scavenge flow circuit 16 and into IPS blower exhaust 20, which then directs the airflow overboard (represented in FIG. 1 by arrows 22). In this manner, IPS system 14 removes a large portion of the debris entrained in the intake airflow to produce a relatively clean air stream supplied to the compressor section of turboshaft engine 10.

In addition to IPS system 14, turboshaft engine 10 also includes a heat exchanger system 25 having a heat exchanger conduit or flow circuit 24 (again, enclosed by ducting in the illustrated example). Heat exchanger flow circuit 24 includes an inlet section 26 and an outlet section 28, which feeds into IPS scavenge flow circuit 16 upstream of IPS blower section 18 via a manifold 29. A heat exchanger 30 is positioned within heat exchanger flow circuit 24 to allow heat transfer from a heated fluid circulated through exchanger 30 (e.g., oil) to the air flowing along circuit 24. During engine operation, airflow is directed into inlet section 26 of heat exchanger flow circuit 24, flows through heat exchanger 30, and is discharged through outlet section 28 of flow circuit 24 into IPS scavenge flow circuit 16 (represented in FIG. 1 by arrows 32). The heated air discharged by heat exchanger 30 mixes with the debris-contaminated air flowing through IPS scavenge flow circuit 16. The combined streams then flow through the IPS blower section 18 and are ultimately discharged overboard via an IPS blower exhaust 20.

As should be gathered from the foregoing description, heat exchanger 30 is fluidly coupled in parallel with the IPS scavenge flow circuit 16 and, specifically, the portion of flow circuit 16 upstream of manifold 29. Heat exchanger flow circuit 24 is thus provided with a dedicated inlet, which is separate and fluidly isolated from the inlet of IPS scavenge flow circuit 16. As a result of this configuration, airflow can be drawn into heat exchanger flow circuit 24 having a debris concentration substantially equivalent to that of the surrounding ambient environment and significantly less than the debris concentration of the air stream within IPS scavenge flow circuit 16. Such a parallel flow configuration thus prevents exposure of heat exchanger 30 to the highly contaminated airflow. The present inventors have recognized, however, that such a parallel flow configuration is limited in several respects. First, the IPS blower is required to continually draw a relatively large volume of air composed of two separate air streams originating from two separate sources. Consequently, the IPS blower may be required to be sized larger than would otherwise be desired and may place an undesirably high load on turboshaft engine 10. Second, the provision of two separate flow circuits for the heat exchanger and IPS streams requires additional plumbing, which adds undesired weight, bulk, and complexity to turboshaft engine 10 and to the host aircraft itself.

To overcome the above-noted limitations, embodiments of the turboshaft engine disclosed herein eliminate the need for a separate heat exchanger flow circuit by placing the heat exchanger (or heat exchangers) in the IPS scavenge flow circuit in flow series with the IPS blower. By eliminating the heat exchanger flow circuit, the size and power requirements of the IPS blower can be reduced and the plumbing of the turboshaft engine can be simplified to allow favorable reductions in the overall weight, complexity, and part count of the turboshaft engine. Furthermore, in cases wherein the turboshaft engine is installed onboard a vehicle having an engine bay lacking a dedicated inlet opening for the heat exchanger flow circuit, this may reduce the modifications necessary to permit installation of the engine onboard the vehicle; e.g., in the case of a helicopter, this may eliminate the need to create additional penetrations through the aircraft skin, which may otherwise be required to create a separate heat exchanger inlet. Positioning the heat exchanger (or heat exchangers) in the IPS scavenge flow circuit does, however, present an additional challenge not encountered by conventional turboshaft engines having parallel IPS and heat exchanger flow circuits; namely, the potential exposure of the heat exchanger to highly contaminated airflow laden with sand or other debris capable of clogging the convoluted internal flow passages of the heat exchanger or otherwise negatively affecting the operation of the heat exchanger. Therefore, to mitigate this issue, embodiments of the turboshaft engine described below employ additional means for removing particulate matter from the IPS stream upstream of the heat exchanger. In preferred embodiments, an IPS blower is positioned upstream of the heat exchanger so as to direct a large portion of the debris into one or more bypass flow ducts, which route highly contaminated airflow around the heat exchanger to minimize the amount of particulate matter ingested thereby, as described more fully below in conjunction with FIGS. 2-4.

Figure 2:
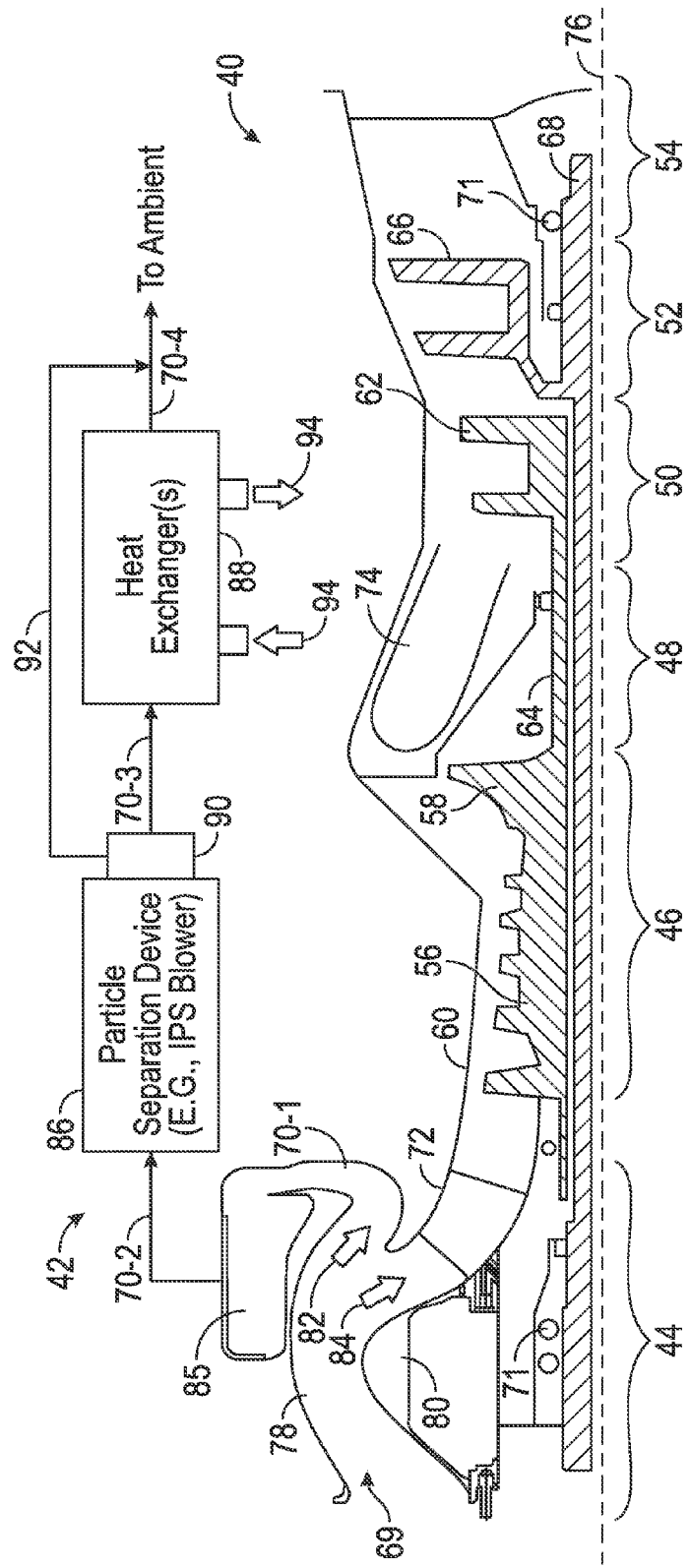
FIG. 2 is a simplified cross-sectional view of an exemplary turboshaft engine including an IPS system, as illustrated in accordance with an exemplary embodiment of the present invention.

FIG. 2 is a simplified cross-sectional view of a turboshaft engine 40 (partially shown) including an IPS system 42, as illustrated in accordance with an exemplary and non-limiting embodiment of the present invention. Turboshaft engine 40 includes an intake section 44, a compressor section 46, a combustion section 48, a gas turbine section 50, a power turbine section 52, and an exhaust section 54. Compressor section 46 includes a multi-stage axial compressor 56 and a centrifugal compressor 58, which are rotatably disposed in flow series within an engine case 60. Turbine sections 50 and 52 includes a multi-stage gas turbine 62 and a multi-stage power turbine 66, respectively, which are likewise rotatably disposed in flow series within engine case 60. In the illustrated example, compressors 56 and 58 and gas turbine 62 are mounted to opposing ends of a gas turbine shaft 64 in a single spool configuration, although it will be appreciated that compressors 56 and 58 may be mechanically joined to separate gas turbines by multiple co-axial shafts in further embodiments wherein engine 40 has a two or three spool configuration. Power turbine 66 is mounted to the aft or trailing end of a power turbine shaft 68, which is coaxial with gas turbine shaft 64; e.g., as shown in FIG. 2, power turbine shaft 68 extends through a longitudinal channel provided in gas turbine shaft 64 to allow a balanced, wide stance support of shaft 64 by bearings 71. In further embodiments, power turbine shaft 68 may be co-axial with gas turbine shaft 64 without extending therethrough.

As illustrated in FIG. 2 and described herein, turboshaft engine 40 is offered by way of example only. It will be readily appreciated that embodiments of the IPS system described herein can be utilized within various other types of gas turbine engine including, but not limited to, other types of turboshaft, turboprop, turbofan, and turbojet engines, whether deployed onboard an aircraft (e.g., a helicopter), watercraft, or ground vehicle (e.g., a tank), included within an auxiliary power unit, included within industrial power generators, or utilized within another platform or application. With respect to exemplary turboshaft engine 40, in particular, it is noted that the particular structure of engine 40 will inevitably vary amongst different embodiments. For example, in certain embodiments, turboshaft engine 40 may employ different combinations of centrifugal compressors or impellers in addition to or in lieu of axial compressors. In further embodiments, turboshaft engine 40 may include any number of shafts along with varying numbers of compressors and turbines. Turboshaft engine 40 will, of course, include various other components that are conventionally-known and that are not shown in FIG. 2 for clarity.

During operation of turboshaft engine 40, ambient air is drawn into main inlet 69 of intake section 44. A fraction of the incoming airflow is diverted into an IPS scavenge flow circuit 70, along with a large portion of any debris entrained in the incoming airflow. By virtue of this debris removal process, a relatively clean core airstream is produced, which is directed through the remainder of intake section 44 and into compressor section 46. Within compressor section 46, the relatively clean core airflow is compressed by compressors 56 and 58 to raise the temperature and pressure of the airflow. The hot, compressed airflow is then supplied to combustion section 48 wherein the air is mixed with fuel injected by a number of fuel injectors (not shown). The fuel/air mixture is then combusted within one or more combustors 74 included within section 48. The combustive gasses expand rapidly and flow through turbine sections 50 and 52 to rotate the turbine rotors of turbines 62 and 66, respectively, about a common rotational axis (represented in FIG. 2 by dashed line 76, also representative of the engine centerline). The rotation of gas turbine 62 drives the rotation of shaft 64, which, in turn, drives the rotation of compressors 56 and 58 about axis 76. By comparison, the rotation of power turbine 66 drives the rotation of shaft 68 to provide the power output of turboshaft engine 40 (note that a non-illustrated gear reduction may also be provided between turbine 66 and rotary output of engine 40). After flowing through power turbine section 52, the combustive gas flow is directed into exhaust section 54 and exhausted from turboshaft engine 40. Although not shown in FIG. 2 for clarity, exhaust section 54 may further include a centerbody and exhaust mixer, which mixes hot combustive gas flow received from turbine section 52 with cooler bypass airflow directed over and around combustors 74.

As previously indicated, IPS system 42 functions to remove a large portion of any particulate matter entrained within the air drawn into intake section 44 during engine operation. With continued reference to the exemplary embodiment shown in FIG. 2, debris or contaminant removal is accomplished by imparting intake section 44 with a curved or bowed inlet flow path 78, which is generally radially symmetrical about centerline 76 and which is defined, in part, by an annular ramp structure 80. As a result of this flow path geometry, debris entrained in the intake airflow is imparted with a radially outward trajectory, which carries the debris (or at least a large portion of the heavier debris) into an inlet flow passage 70-1 included within IPS scavenge flow circuit 70. Some debris may also be directed into flow passage 70-1 due to impingement with ramp structure 80 and/or the inlet flow passage walls. Thus, as represented in FIG. 2 by arrow 82, a debris-rich or a highly contaminated bypass stream is diverted into IPS scavenge flow circuit 70, while a relatively clean core airstream is supplied to compressor section 46 and the latter sections of turboshaft engine 40 (represented in FIG. 2 by arrow 84). IPS inlet flow passage 70-1 may, in turn, direct the contained bypass stream into an enlarged debris trap or chamber 85 (commonly referred to as a "scroll"). The contaminated bypass stream may then be drawn from chamber 85 and directed through a series of ducts 70-2, 70-3, and 70-4 before expulsion from IPS system 42 and, more generally, from turboshaft engine 40 through an IPS blower exhaust (schematically represented in FIG. 2 by flow line 70-4).

It should thus be appreciated that, as does IPS system 14 described above in conjunction with FIG. 1, IPS system 42 functions to remove a large portion of particulate debris from the air drawn into the intake section of its host turboshaft engine. However, IPS system 42 differs from IPS system 14 (FIG. 1) in several notable respects. First, IPS system 42 includes a heat exchanger 88, which is fluidly coupled to IPS scavenge flow circuit 70 and which receives pressurized airflow therefrom. Additionally, IPS system 42 includes a particle separation device 86 and a splitter structure 90, which are positioned upstream of heat exchanger 88 and which protect heat exchanger 88 from the debris-laden airflow in scavenge flow circuit 70. More particularly, particle separation device 86 and splitter structure 90 cooperate or combine to direct a large portion of the debris entrained in the airflow in IPS scavenge flow circuit 70 into at least one heat exchanger bypass duct 92, which conducts the concentrated debris over and around heat exchanger 88. Particle separation device 86 can assume any form suitable for directing particulate matter entrained in the IPS airstream into heat exchanger bypass duct 92. For example, in certain embodiments, particle separation device 86 may include one or more panels each containing an array of vortex tubes. In such embodiments, IPS system 42 may still include an IPS blower coupled in flow series with heat exchanger 88; however, in this case, the IPS blower can be positioned either upstream or downstream of heat exchanger 88. This example notwithstanding, it is preferred that particle separation device 86 includes or assumes the form of the IPS blower itself. In particular, it is preferred that the IPS blower is positioned upstream of heat exchanger 88 and splitter structure 90 and configured to direct particulate matter into the inlet of heat exchanger bypass duct 92 due to centrifugal or cyclonic forces generated by the blower and/or due to impingement with the spinning blades or other structural components of the blower with the entrained particulates. In this manner, an IPS blower can provide the dual function of facilitating removal of particulate debris from the heat exchanger core airstream, while also promoting airflow through IPS scavenge flow circuit 70 to reduce the overall weight, part count, and complexity of IPS system 42. An exemplary manner in which IPS system 42 may be structurally implemented wherein particle separation device 86 assumes the form of an IPS blower will now be described in conjunction with FIGS. 3 and 4.

Figure 3:
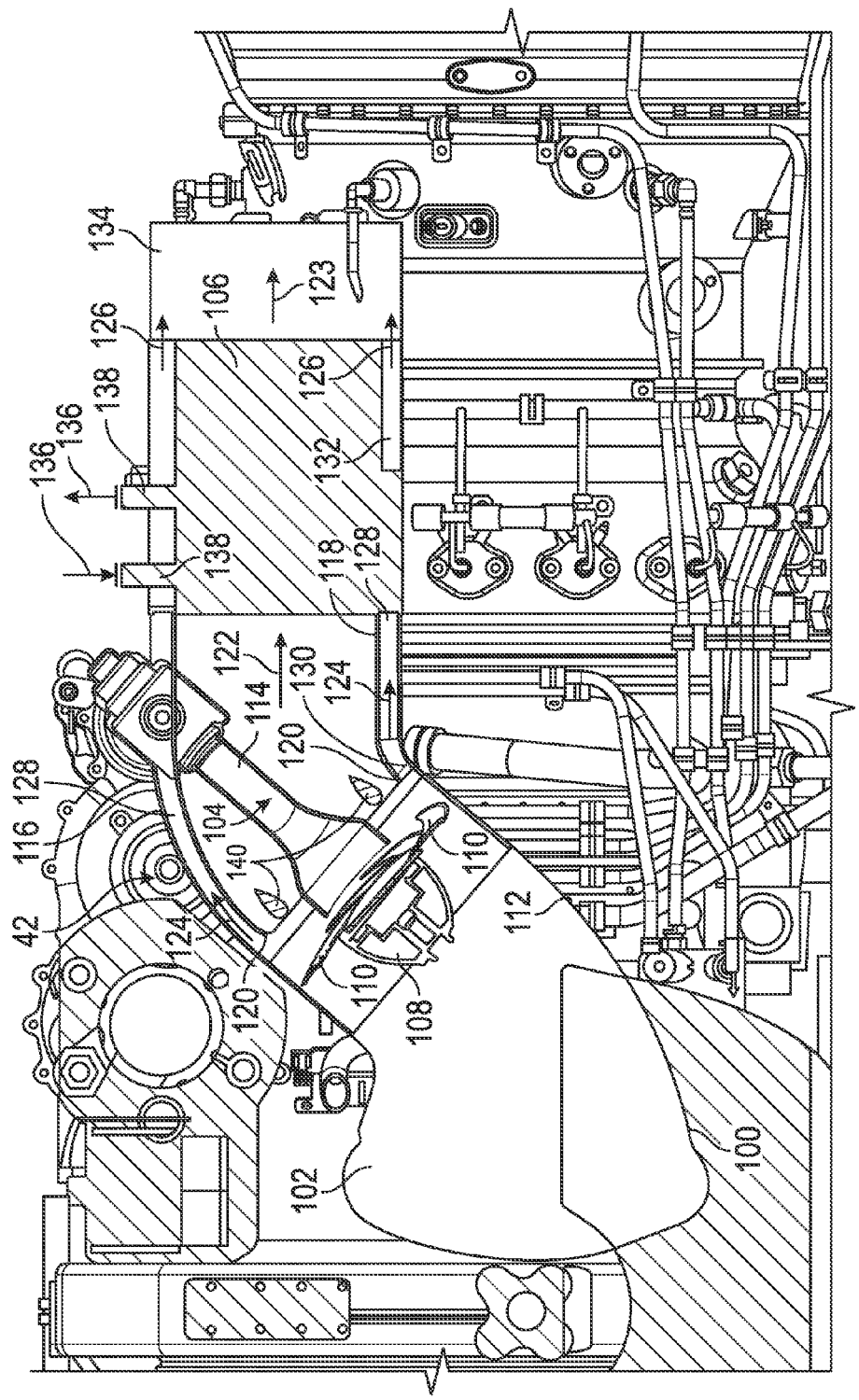
FIGS. 3 and 4 are cross-sectional and isometric views, respectively, illustrating one possible manner in which the exemplary IPS system shown in FIG. 2 can be structurally implemented.
Figure 4:
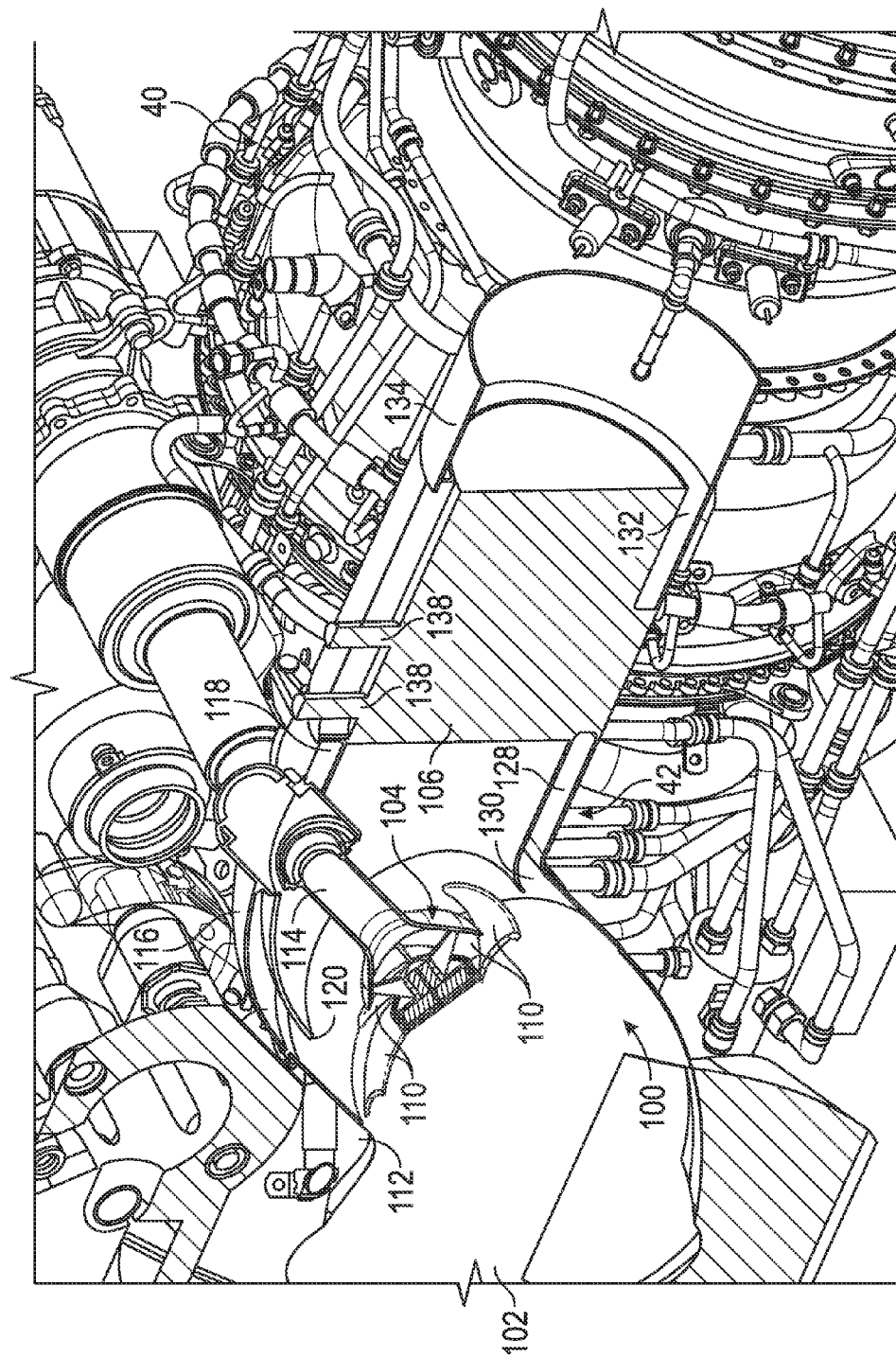

FIGS. 3 and 4 are side and isometric cross-sectional views, respectively, illustrating one manner in which IPS system 42 (FIG. 2) can be structurally implemented, in accordance with an exemplary and non-limiting embodiment. IPS system 42 includes an IPS scavenge flow circuit 102, which is enclosed by ducting 100 and which corresponds to scavenge flow circuit 70 schematically illustrated in FIG. 2. An IPS blower 104 and a heat exchanger 106 (corresponding to particle separation device 86 and heat exchanger 88, respectively, in FIG. 2) are fluidly coupled in flow series within IPS scavenge flow circuit 102. It can be seen in FIGS. 3 and 4 that IPS blower 104 may assume the form of an axial fan having a number of blades 110. Blower 104 is supported by an elongated shaft 114, which penetrates through a sidewall of ducting 100. In embodiments wherein blower 104 lacks an independent motor, shaft 114 may be a drive shaft, which mechanically couples IPS blower 104 to a rotary mechanical input, such as a gearbox included within turboshaft engine 40 (not shown). Alternatively, in embodiments wherein blower 104 contains an electrical motor, shaft 114 may provide routing of electrical wires to the motor of blower 104. In the illustrated example, elongated shaft 114 is mounted at an acute angle with respect to the centerline of IPS scavenge flow circuit 102 such that blower 104 is suspended within a curved segment 112 included scavenge flow circuit 102. IPS blower 104 is preferably centered within scavenge flow circuit 102 such that a relatively small annular clearance is provided between tips of fan blades 110 and the surrounding circumferential wall of ducting 100; however, the disposition and dimensions of IPS blower 104 will inevitably vary amongst different embodiments of IPS system 42.

Ducting 100 comprises an outer conduit 116 and an inner conduit 118, which is disposed within outer conduit 116 and extends along a portion of the length thereof. In the exemplary embodiment shown in FIGS. 3 and 4, conduits 116 and 118 are substantially co-axial. Outer conduit 116 and inner conduit 118 may each have a circular cross-sectional geometry with the outer diameter of inner conduit 118 being less than the inner diameter of outer conduit 116. Outer conduit 116 and inner conduit 118 are conveniently, although not necessary, fabricated as a single, integral piece utilizing, for example, a casting process. Heat exchanger 106 may be mounted or nested within inner conduit 118. Alternatively, heat exchanger 106 may be mounted adjacent, and preferably sealingly engages or abuts, the trailing end of inner conduit 118, as shown in FIGS. 3 and 4. As represented in FIG. 3 by arrows 136, heat exchanger 106 is circulate one or more heated fluids during operation of turboshaft engine 40 to allow heat transfer from the heated fluids to the air flowing through heat exchanger 106. In one embodiment, heat exchanger 106 is an oil cooler, a fuel cooler, or a combination thereof. In further embodiments, IPS system 42 may include multiple heat exchangers (e.g., an oil cooler and a fuel cooler) arranged in flow series.

A heat exchanger bypass duct 128 is formed between the inner and outer surfaces of outer conduit 116 and inner conduit 118, respectively. Additionally, heat exchanger 106 may also partially bound the inner circumference of bypass duct 128 and have an outer geometry and dimensions similar to those of inner conduit 118; e.g., heat exchanger 106 may have a tubular outer geometry and an outer diameter substantially equivalent to the outer diameter of inner conduit 118. Heat exchanger bypass duct 128 has an inlet 130, which is located between IPS blower 104 and heat exchanger 106; and an outlet 132, which is located downstream of heat exchanger 106. Inlet 130 of heat exchanger bypass duct 128 is preferably located immediately downstream of IPS blower 104 such that inlet 130 generally aligns with the tips of blades 110, as taken along the centerline of IPS scavenge flow circuit 102. As indicated in FIG. 3 by arrows 126, bypass duct outlet 132 may be positioned so as to direct the contaminated bypass stream into the heated air discharged from heat exchanger 106 (represented by arrow 123) to provide secondary cooling prior to discharge of the airflow through IPS exhaust 134. In the illustrated example wherein conduits 116 and 118 are co-axial, heat exchanger bypass duct 128 has a substantially tubular geometry, while inlet 130 and outlet 132 are substantially annular orifices. Heat exchanger bypass duct 128 circumscribes inner conduit 118 and the core airflow path along which relatively clean airflow is supplied to heat exchanger 106. As further shown in FIGS. 3 and 4, inlet and outlet flow passages 138 of heat exchanger 106 may extend radially through bypass duct 128 and the wall of outer conduit 116 to permit exchanger of the fluid or fluids cooled by heat exchanger 106.

The annular leading edge portion of inner conduit 118 serves as a splitter structure 120, which divides airflow through IPS scavenge flow circuit 102 into two separate streams. The two separate streams are: (i) a relatively clean heat exchanger core stream (represented in FIG. 3 by arrows 122 and 123), which is supplied to heat exchanger 106 to convectively absorb heat from the heated fluid or fluids (e.g., oil and/or fuel) circulated through heat exchanger 106, and (ii) a highly contaminated bypass stream (represented in FIG. 3 by arrows 124 and 126), which is directed into heat exchanger bypass duct 128 and conducted over and around heat exchanger 106. IPS blower 104 urges particulate matter into heat exchanger inlet 130 by producing a cyclonic or vortex outflow, which urges heavier particles entrained in the airflow radially outward and into heat exchanger inlet 130 due to centrifugal forces. In addition, IPS blower 104 may also direct particulate matter entrained in the airflow into inlet 130 of bypass duct 128 due to impingement with the spinning blades of blower 104 and/or other structural components of blower 104; e.g., as shown in FIGS. 3 and 4, blower 104 may also include a domed nosepiece 108 (identified in FIG. 3), which may also direct particulate matter radially outward when impinged thereby. In this manner, particulate matter is removed from clean core stream directed into inner conduit 118 and flowing through heat exchanger 106 thereby minimizing exposure of heat exchanger 106 to the contaminated airflow. As a result, heat exchanger 106 can be placed in IPS scavenge flow circuit 102 thereby eliminating the need for a separate heat exchanger flow path and inlet included within other conventional turboshaft engine designs, such as turboshaft engine 10 described above in conjunction with FIG. 1. In certain embodiments, one or more static structures (e.g., a plurality of stator vanes 140, as generically illustrated in FIG. 3) may be positioned in the core heat exchanger flow path defined by inner conduit 118 upstream of heat exchanger 106 and downstream of IPS blower 104 (e.g., near the mouth of inner conduit 118) to improve blower performance and/or to help straighten-out or otherwise condition airflow prior to entry into heat exchanger 106.

Figure 5:
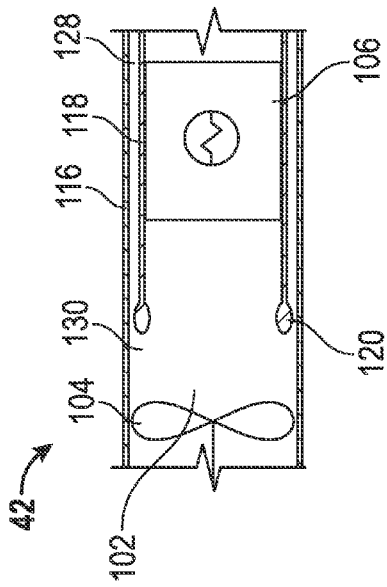
FIG. 5 is cross-sectional schematic view of an IPS system (partially shown) wherein the leading edge of an inner conduit has a radially convergent geometry, as illustrated in accordance with a further exemplary embodiment of the present invention.
Figure 8:
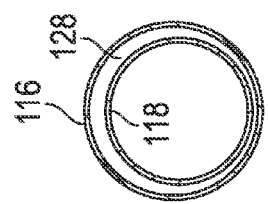
FIGS. 7 and 8 are cross-sectional views of an IPS system (partially shown) wherein the inner conduit is axially offset relative to the outer conduit, as illustrated in accordance with a still further exemplary embodiment of the present invention.
Figure 6:
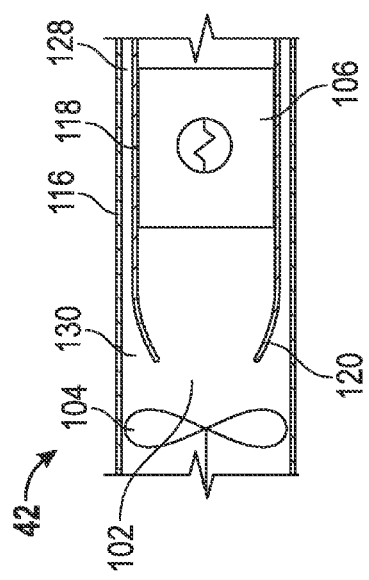
FIG. 6 is cross-sectional schematic view of an IPS system (partially shown) wherein the leading edge of an inner conduit has an enlarged circumferential lip, as illustrated in accordance with a still further exemplary embodiment of the present invention.
Figure 7:
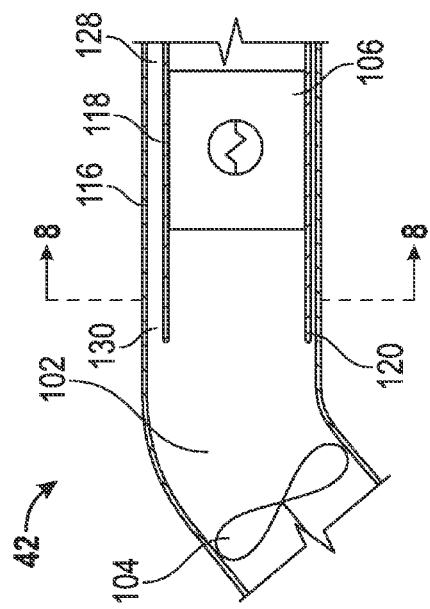

In the above-described exemplary embodiment, leading edge portion of inner conduit 118 serves as splitter structure 120, which divides the airflow through IPS scavenge flow circuit 102 into contaminated bypass and core heat exchanger airflow streams. The geometry and dimensions of leading edge portion 120 of inner conduit 118, and the positioning of leading edge portion 120 of inner conduit 118 relative to IPS blower 104, can be varied as appropriate to optimize debris flow into heat exchanger bypass duct 128. For example, as indicated in FIG. 5, leading edge portion 120 of inner conduit 118 may be fabricated to curve radially inward or converge toward the centerline of IPS scavenge flow circuit 102 to increase the cross-sectional flow area of the mouth or inlet of heat exchanger bypass duct 128. Additionally or alternatively, as shown in FIG. 6, leading edge portion 120 of inner conduit 118 may be provided with an enlarged circumferential lip having an aerodynamic shape to promote smooth, laminar flow into the core airflow path and heat exchanger bypass duct 128. Furthermore, while in the above-described exemplary embodiment, inner conduit 118 is concentrically or coaxially disposed within outer conduit 116, this need not always be the case. For example, as shown in FIGS. 7 and 8, inner conduit 118 may be axially offset from outer conduit 116 such that the cross-sectional flow area across inlet 130 of heat exchanger bypass duct 128 varies, when viewed along and taken about the centerline or longitudinal axis of scavenge flow circuit 102. Such a configuration may be advantageous when leading edge portion 120 of inner conduit 118 is located downstream of a curved section 112 of scavenge flow circuit 102, which may tend to concentrate the debris entrained in the airflow in a particular region of scavenge flow circuit 102 as the airflow is conducted through the curved section; e.g., in the case of the exemplary embodiment shown in FIGS. 7 and 8, inner conduit 118 may be moved closer to the inner bend of curved section 112 to increase the cross-sectional area located immediately downstream of the outer portion of the bend to take advantage of the greater particulate concentration is this region inherently occurring as a result of the momentum of the debris flowing around curved section 112.

There has thus been provided an exemplary turboshaft engine including an IPS system having a heat exchanger coupled in flow series with an IPS blower or other particle separation device in the IPS scavenge flow circuit. The above-described turboshaft engine reduces the airflow requirements of the IPS blower thereby allowing the size of the IPS blower to be minimized and decreasing the load placed on the turboshaft engine by the IPS blower. The above-described turboshaft engine further eliminates the need for a separate heat exchanger flow circuit to reduce the weight, bulk, and complexity of the turboshaft engine. Additionally, in cases wherein the turboshaft engine is installed onboard a helicopter or other vehicle having an engine bay lacking a dedicated inlet opening for the heat exchanger flow circuit, the above-described turboshaft engine can be installed onboard the vehicle without requiring the creation additional penetrations through the vehicle or aircraft skin.

In one embodiment, the turboshaft engine includes in IPS system wherein an oil cooler is packaged in series behind an IPS blower such that, during operation, the spinning blades of the blower are utilized to centrifuge sand particles and other debris around the oil cooler via one or more bypass flow channels. Advantageously, such a configuration protects the oil cooler from the debris concentration present in the scavenge circuit and reduces the overall flow requirement of the blower, which, in turn, allows for a reduction in the horsepower draw on the engine and overall weight of the blower. While primarily described above in the context of a fully function system, the foregoing has also provided embodiments of a method for fabricating an Inlet Particle Separator (IPS) system utilized in conjunction with a gas turbine engine, such as a turboshaft engine, having an intake section. The method may include the steps of fluidly coupling an IPS scavenge flow circuit to the intake section, and placing an IPS blower and a heat exchanger in flow series within the IPS scavenge flow circuit. The IPS blower is positioned upstream of the heat exchanger and configured to generate centrifugal forces during operation urging particulate matter entrained in the airflow through the IPS scavenge flow circuit around the heat exchanger to reduce the amount of particulate matter ingested by the heat exchanger.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as setforth in the appended claims.

What is claimed is:

1. A turboshaft engine, comprising:
   an inlet section; and
   an Inlet Particle Separator (IPS) system, comprising:
      an IPS scavenge flow circuit fluidly coupled to the inlet section;
      a heat exchanger fluidly coupled to the IPS scavenge flow circuit and configured to receive airflow therefrom;
      an IPS blower mounted in the IPS scavenge flow circuit and having a plurality of fan blades; and
      a heat exchanger bypass duct having an inlet upstream of the heat exchanger and having an outlet downstream of the heat exchanger, the heat exchanger bypass duct directing airflow received at the inlet around the heat exchanger; and an inner conduit extending from a location immediately downstream of the fan blades to the heat exchanger to at least partially define the heat exchanger bypass duct.

2. The turboshaft engine of claim 1, wherein the IPS blower is mounted through a wall of the inner conduit.

3. The turboshaft engine of claim 2 wherein the inlet of the heat exchanger bypass duct is fluidly coupled between the IPS blower and the heat exchanger.

4. The turboshaft engine of claim 3 wherein the IPS blower comprises blade tips generally aligning with the inlet of the heat exchanger bypass duct, as taken along the longitudinal axis of the IPS scavenge flow circuit at a location of the axial fan.

5. The turboshaft engine of claim 2 wherein the IPS system further comprises:

an outer conduit further defining the IPS scavenge flow circuit;

wherein the inner conduit is located within the outer conduit and extends along a portion of a length thereof.

6. The turboshaft engine of claim 5, wherein the heat exchanger is mounted within the outer conduit adjacent a downstream end of the inner conduit.

7. The turboshaft engine of claim 1 wherein the heat exchanger comprises one of the group consisting of an oil cooler and a fuel cooler.

8. The turboshaft engine of claim 1 further comprising an IPS exhaust immediately downstream of the heat exchanger and into which the outlet of the heat exchanger bypass duct discharges contaminated bypass airflow.

9. The turboshaft engine of claim 1, wherein a leading edge of the inner conduit defines a splitter structure configured to divide the airflow through the IPS scavenge flow circuit into a contaminated bypass stream and a clean core stream directed into the heat exchanger bypass duct and into the heat exchanger, respectively.

10. The turboshaft engine of claim 9, wherein the inner conduit defines a core airflow path configured to supply the clean core stream to the heat exchanger, and wherein a cross-sectional flow area of the core airflow path is greater than a cross-sectional flow area of the heat exchanger bypass duct.

11. The turboshaft engine of claim 9, wherein the leading edge of the inner conduit has an enlarged circumferential lip.

12. The turboshaft engine of claim 1, wherein a leading edge portion of the inner conduit curves radially inward toward a centerline of the IPS scavenge flow circuit.

13. A turboshaft engine, comprising:
an inlet section; and
an Inlet Particle Separator (IPS) system, comprising:
an IPS scavenge flow circuit fluidly coupled to the inlet section;
a heat exchanger disposed within the IPS scavenge flow circuit;
a heat exchanger bypass duct fluidly coupled to the IPS scavenge flow circuit and configured to direct a contaminated bypass stream around the heat exchanger; and
an IPS blower mounted through at least one wall of the heat exchanger bypass duct at a location substantially adjacent and upstream of the heat exchanger, the IPS blower configured to generate centrifugal forces during operation urging particulate matter entrained in the airflow through the IPS scavenge flow circuit into the heat exchanger bypass duct to reduce an amount of particulate matter ingested by the heat exchanger during operation of the turboshaft engine.

14. A turboshaft engine, comprising:
an inlet section; and
an Inlet Particle Separator (IPS) system, comprising:
an IPS scavenge flow circuit fluidly coupled to the inlet section;
a heat exchanger fluidly coupled to the IPS scavenge flow circuit;
an outer conduit within which the heat exchanger is mounted;
an inner conduit extending within the outer conduit to the heat exchanger and defining, at least in part, a clean core airflow path through which airflow is directed into the heat exchanger; and
a heat exchanger bypass duct at least partially defined by the inner conduit and the outer conduit, the heat exchanger bypass duct configured to direct a contaminated airflow bypass stream around the heat exchanger during operation of the turboshaft engine.

15. The turboshaft engine of claim 14 wherein the heat exchanger comprises inlet and outlet flow passages extending through the heat exchanger bypass duct.

16. The turboshaft engine of claim 14 wherein the IPS system further comprises an IPS exhaust into which the heat exchanger bypass duct and the heat exchanger each discharge airflow.

17. The turboshaft engine of claim 14 further comprising a particle separation device mounted in the outer conduit at a location immediately upstream of the inner conduit and the heat exchanger bypass duct.

18. The turboshaft engine of claim 14 further comprising an IPS blower having fan blades positioned immediately upstream of the inner conduit and the heat exchanger bypass duct.

19. The turboshaft engine of claim 18 wherein IPS blower comprises an elongated shaft mounted at an acute angle with respect to a centerline of the IPS scavenge flow circuit.

20. The turboshaft engine of claim 14 wherein the inner conduit comprises a downstream end portion, which sealingly abuts the heat exchanger.

* * * * *